United States Patent [19]
Perks

[11] 3,711,150
[45] Jan. 16, 1973

[54] HINGED DEFLECTORS FOR SLIDING ROOFS

[75] Inventor: Joseph Perks, Birmingham, England
[73] Assignee: Weathershields Limited, Birmingham, England
[22] Filed: Jan. 7, 1971
[21] Appl. No.: 104,727

[30] Foreign Application Priority Data
Jan. 10, 1970 Great Britain..................1.300/70

[52] U.S. Cl. ................................................296/137 E
[51] Int. Cl. ...................................................B60j 7/10
[58] Field of Search..............296/137 E, 137 C, 84 K

[56] References Cited
UNITED STATES PATENTS
1,981,897 11/1934 Bishop..............................296/137 E FOREIGN PATENTS OR APPLICATIONS
534,498 10/1955 Italy..................................296/137 E Primary Examiner—Benjamin Hersh
Assistant Examiner—Robert R. Song
Attorney—Scrivener, Parker, Scrivener & Clarke

[57] ABSTRACT

A hinged draught deflector for a vehicle sliding roof comprises a flap carried by a pair of transversely spaced longitudinal arms. The arms are pivotally connected to brackets for connection to the fixed roof structure on opposite sides of an opening adapted to be closed by a slidable panel. Springs act between the arms and the brackets to urge the flap upwardly and rearwardly into a raised operative position.

2 Claims, 3 Drawing Figures

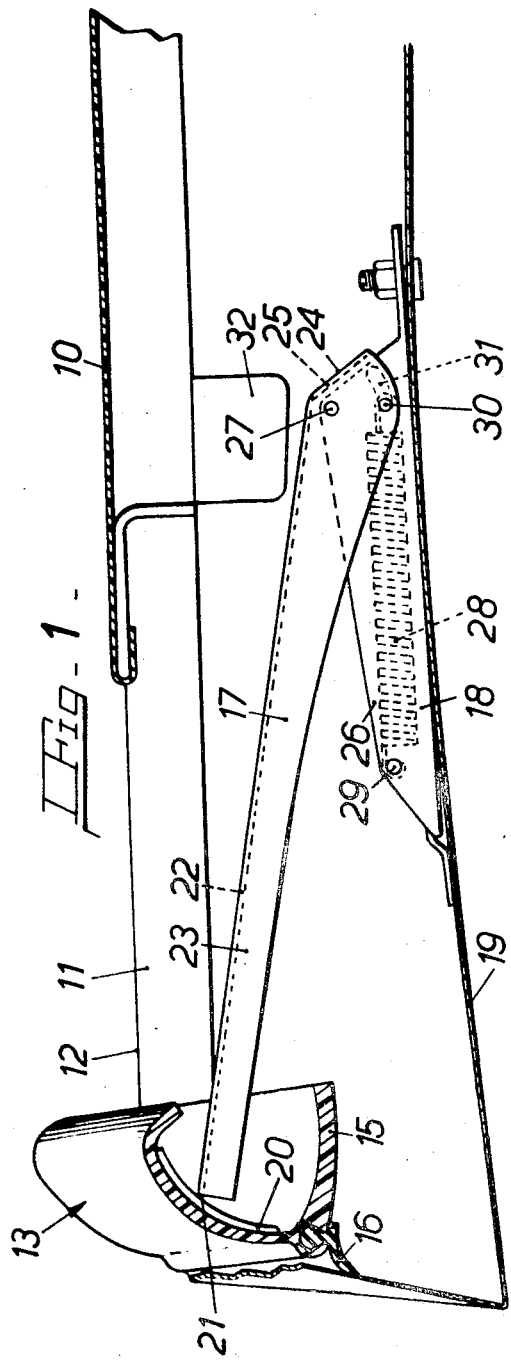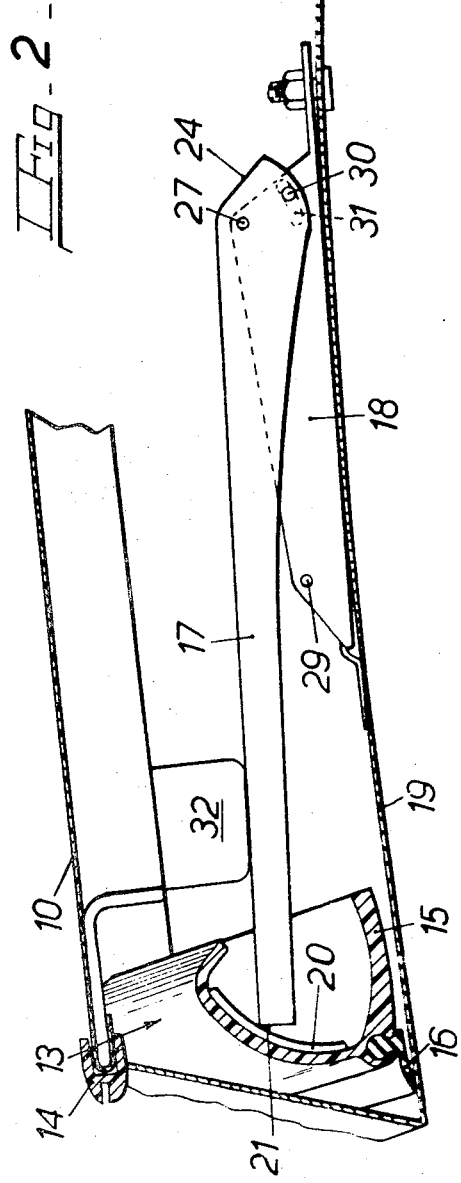

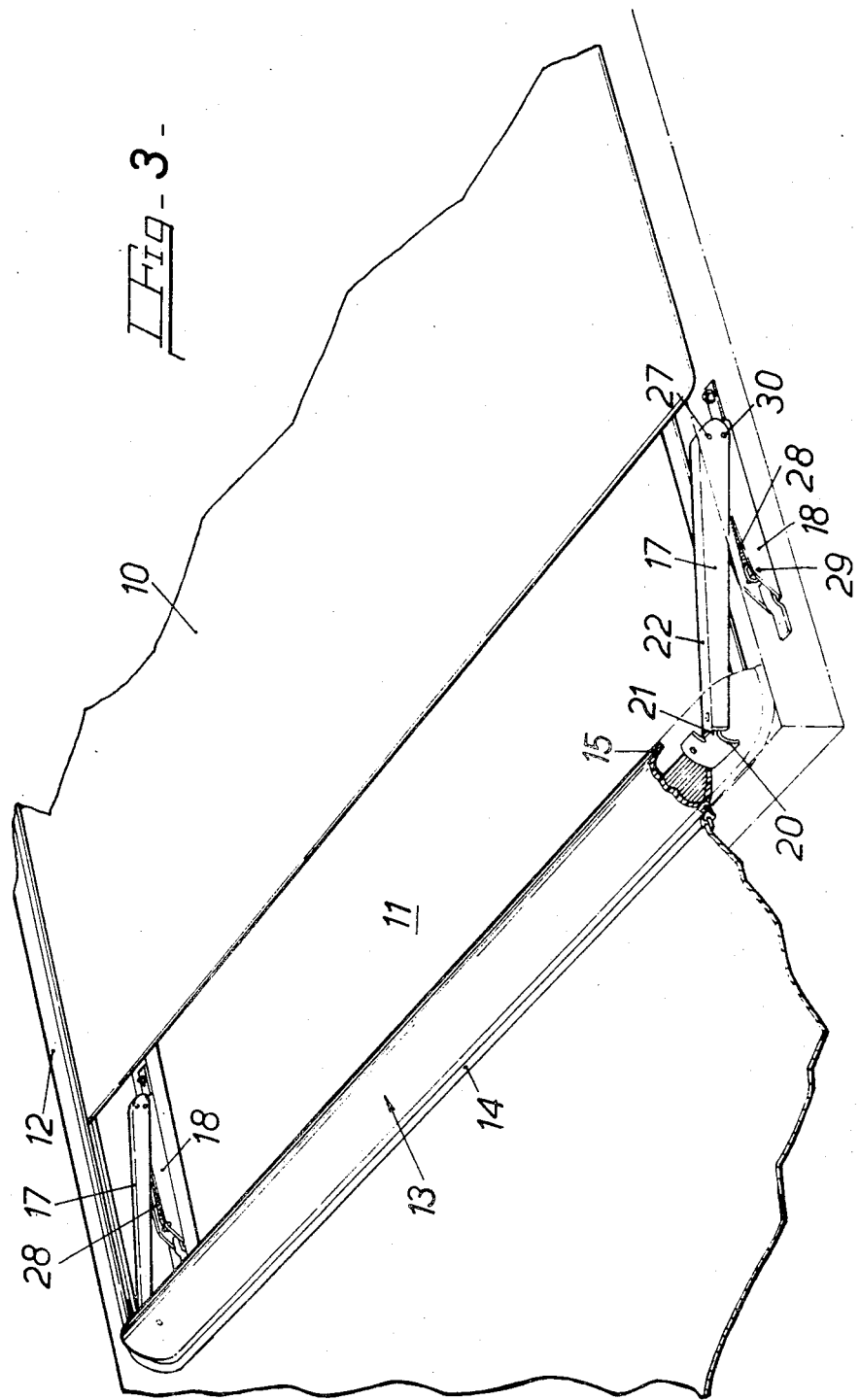

HINGED DEFLECTORS FOR SLIDING ROOFS

This invention relates to hinged draught deflectors for vehicle sliding roofs of the kind in which a transverse flap is located at the front end of an opening in the front part of a vehicle roof, adapted to be closed by a longitudinally sliding panel, and the flap is supported at each end by spring loaded means which urge the flap into an upwardly and rearwardly inclined operative position and which are adapted to be engaged by the sliding panel as it moves into the closed position to close the flap into an inoperative position in which it lies within the opening and the panel can slide over it.

Hitherto in hinged draught deflectors of the kind set forth the flap is pivotally connected at its forward edge to the fixed roof structure at the front end of the opening, and the spring loaded means are each secured separately to the fixed roof structure on one side of the opening.

Depending upon the particular vehicle in which the deflector is to be incorporated, it is often difficult without, performing extensive modifications, to provide the pivotal connection between the flap and the roof structure.

In another known construction of hinged draught deflector the spring loaded means each comprises a resilient blade spring secured at its rear end to the fixed structure on a corresponding side of the opening and carrying the flap at its opposite forward end. When the roof panel is moved rearwardly into an open position the flap is urged upwardly by the resilience of the blade spring and it is difficult to arrange for each spring to deflect by the same amount to ensure that, in the operative position, the flap lies in a position spaced from the fixed roof structure by a constant distance throughout its length.

According to our invention in a hinged deflector of the kind set forth the flap is carried by a pair of transversely spaced longitudinally extending arms pivotally connected at their ends remote from the flap to brackets adapted to be secured to the fixed structure of the roof on opposite sides of the opening, and springs acting between the arms and the brackets apply to the arms turning moments to urge the flap upwardly and rearwardly into the operative position.

Preferably each spring comprises a helical tension spring which acts between a transverse pin fixed in an arm at a position spaced below its pivotal connection with a bracket, and an anchorage in the bracket forward of the pivotal connection between the arm and the bracket.

The extent of the opening movement of the flap with respect to the bracket is limited by an engagement between complementary parts of each arm and the bracket to which that arm is pivotally connected. Conveniently this is achieved by an engagement between the pin and the forward end of an arcuate slot in the bracket in which the pin is slidably guided.

The forces of the tension springs are contained wholly within a pair of sub-assemblies each comprising an arm and a bracket to which it is pivotally connected.

The deflector is mounted in any convenient position with respect to the forward end of an opening in a vehicle roof by simply securing the brackets to the fixed structure on opposite sides of the opening, no other modifications being required.

One embodiment of our invention is illustrated in the accompanying drawings in which:

FIG. 1 is a longitudinal section through the front part of a vehicle roof fitted with a longitudinally slidable panel and a hinged deflector which is shown in an operative position;

FIG. 2 is a similar section showing the panel and the deflector in a closed position; and FIG. 3 is a perspective view of hinged deflector shown in FIGS. 1 and 2.

In the embodiment illustrated in the drawings 10 is a longitudinally slidable panel adapted to close an opening 11 in the front part of a vehicle roof 12, the opening being uncovered by sliding the panel rearwardly in any known manner.

A deflector 13 extends transversely across the front end of the roof opening immediately behind a cross-member 14. The deflector 13 comprises a flap 15 which is of curved convex outline or 'C' shaped section in a forward direction and is of a constant section throughout its length. The flap 15 may be moulded from a synthetic plastics material which may be opaque or transparent and is curved to the transverse contour of the roof. Alternatively the flap 15 may be constructed from a sheet metal pressing. In either construction the flap 15 carries a forwardly projecting transversely extending sealing strip 16 of flexible resilient material for sealing engagement with the cross member 14 when the deflector is in the operative position shown in FIG. 1.

The flap 15 is carried from the free forward ends of a pair of arms 17, which in turn are hingedly connected at their rear ends to brackets 18 secured to a portion of the fixed structure 19 of the roof 12 on opposite sides of the opening 11.

As illustrated the rear face of the flap 15 is secured to a transverse mounting strip 20 which is of curved convex outline in a forward direction complementary to that of the flap 15. Opposite end portions at the upper edge of the mounting strip 20 are deformed downwardly to form a pair of rearwardly extending spaced tongues 21. Each tongue 21 lies in a position disposed at an angle of less than 90° with respect to a tangent at the point in the current surface of the mounting strip 21 with which that tongue 21 is continuous in a direction towards the upper edge of the mounting strip 20.

Each arm 17 is of substantially inverted U shaped channel section having a central web 22 provided with a pair of downwardly extending spaced parallel side flanges 23 between which the tongue 21 at that end of the mounting strip 20 is received and is secured to the web 22 at that end of the arm 17. The flanges 23 are of a constant depth for a major part of their lengths but adjacent to their opposite rear ends lead into enlarged portions where the depth of the flanges 23 is increased and the flanges are of substantially convex outlines at their lowermost edges. The end edges 24 of the flanges 23 at the termination of the portions of convex outline are inclined with respect to the web 22 with which they define on obtuse angle, and a portion 25 of the web 22 at that end of the arm 17 is deformed downwardly between the flanges 23 into a position in which its outer surface is aligned substantially with the inclined end edges 24.

Each bracket 18 is of substantially U-shaped channel section having a pair of parallel longitudinally extending upstanding flanges 26. The enlarged portions of the flanges 23 of each arm 17 straddle the flanges 26 of the bracket 17 on that side of the opening 11, and the arm 17, adjacent to its rear end, is pivotally connected to the bracket 17 by a transverse pin 27 which is passed through aligned complementary openings in the flaps 23 and 26 and is fixedly secured at opposite ends in the openings in the flanges 23.

Each bracket 18 extends forwardly by a substantial distance from its pivotal connection 27 with an arm 17. A helical tension spring 28 is housed between the flanges 26 of each bracket. Each tension spring 28 is anchored at opposite ends between a transverse pin 29 secured at opposite ends in the flanges 26 adjacent to the forward end of the bracket in which it is housed, and a transverse pin 30 secured at opposite ends between the flanges 23 of the arm 17 which is pivotally connected to that bracket. Each transverse pin 30 is located in a position spaced downwardly in a radial direction from the pivot pin 27 and extends through aligned arcuate slots 31 in the flanges of the bracket 18. The arcuate slots are of sufficient circumferential length to ensure that movement of the deflector 13 between an operative raised position and an inoperative closed position is not impeded.

The rear end edges 32 of the flanges 26 of the brackets 18 are inclined forwardly at acute angles so that they are parallel with and spaced from the inner faces of the portion 25 of the webs 22 when the deflector 13 is in the operative raised position shown in FIG. 1.

When the panel 10 is slid towards its open position shown in FIG. 1 of the drawings, the forces in the tension springs 28 act through the transverse pins 30 to move the arms 17 and the flap 15 upwardly and rearwardly about the pivot pins 27 as axes and into the operative raised position defined by engagements between the pins 30 and the forward ends of the arcuate slots 31 in the brackets 18. In that position the sealing strip 16 engages with the cross-member 14 to prevent draughts being caused by air flow between the flap 15 and the cross-member 14. When the vehicle is in motion the deflector deflects upwardly clear of the opening 11 air flowing over the windscreen and over part of the roof in front of the opening 11.

When the panel 10 is slid towards its closed position shown in FIG. 2, downwardly depending transversely spaced abutments 32 adjacent to the forward edge of the panel 10 engage with the arms 17 to move the arms 17 and the flap 15 downwardly and forwardly against the free into the tension springs 28 and into the inoperative position in which the flap 15 lies within the opening 11 and the panel 10 is slid over it.

I claim:

1. A hinged draught deflector for a vehicle sliding roof of the type comprising a longitudinally slidable panel for closing an opening in a front part of a vehicle roof, said hinged draught deflector comprising a transverse flap for location at the front end of an opening in a vehicle roof, a pair of transversely spaced longitudinally extending arms each having a forward end and a rear end, rigid connections between said forward ends of said arms and said flap, a pair of brackets for connection to roof structure on opposite sides of the opening, a pivotal connection between said rear end of each arm and one of said brackets, springs acting between said arms and said brackets to apply to said arms turning moments to urge said flap upwardly and rearwardly into an operative position, each bracket being provided with an arcuate slot having a forward end, and a transverse pin fixed in each arm slidably guided within said arcuate slot in said bracket to which that arm is connected by said pivotal connection, and an engagement between said forward end of each slot and said transverse pin slidably guided therein defining said operative position of said flap, said deflector being so constructed and arranged that when it is installed in a sliding roof the said arms are adapted to be engaged by the slidable panel as the panel is moved into a position to close the opening whereby said flap is moved into an inoperative position in opposition to said springs in which said flap lies within the opening and the panel can slide over it.

2. A hinged draught deflector for a vehicle sliding roof of the type comprising a longitudinally slidable panel for closing an opening in a front part of a vehicle roof, said hinged draught deflector comprising a transverse flap for location at the front end of an opening in a vehicle roof, a pair of transversely spaced generally U-shaped channel section arms having a pair of substantially parallel downwardly extending spaced flanges and a forward end and a rear end, rigid connections between said forwards ends of said arms and said flap, a pair of brackets for connection to roof structure on opposite sides of the opening, each bracket having a pair of upstanding flanges which are straddled by said flanges of one of said arms, a pivotal connection between said rear end of each arm and one of said brackets, each pivotal connection comprising a transverse pivot pin passed through aligned complementary openings in said flanges of said arm and said bracket, a second transverse pin fixed in said flanges of each arm at a position spaced below said pivotal connection, said flanges of said brackets being provided with aligned arcuate slots in which said second transverse pins are received, an anchorage in each bracket forward of said pivotal connection, and helical tension springs acting between said second transverse pins and said anchorages to apply to said arms turning moments to urge said flap upwardly and rearwardly into an operative position, said deflector being so constructed and arranged that it is installed within a sliding roof the said arms are adapted to be engaged by the slidable panel as the panel is moved into a position to close the opening whereby said flap is moved into an inoperative position in opposite to said helical tension springs in which said flap lies within said opening and the panel can slid over it.

* * * * *